United States Patent [19]

Wackerle et al.

[11] Patent Number: 4,589,679

[45] Date of Patent: May 20, 1986

[54] SAFETY STEERING COLUMN MADE OF FIBER-REINFORCED SYNTHETIC MATERIALS

[75] Inventors: Peter Wackerle, Ottobrunn; Ralf-Thilo Schulz, Putzbrunn; Franz Sperber, Kolbermoor; Wolfram Koletzko, Rosenheim; Wolfgang Prochaska, Munich, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 615,347

[22] Filed: May 30, 1984

[30] Foreign Application Priority Data

Jun. 11, 1983 [DE] Fed. Rep. of Germany ....... 3321198

[51] Int. Cl.$^4$ .............................................. B62D 1/18
[52] U.S. Cl. ...................................... 280/777; 74/492
[58] Field of Search ................... 280/777; 74/492, 493

[56] References Cited

U.S. PATENT DOCUMENTS 4,304,147 12/1981 Linnemeier et al. ................. 74/792
4,465,301 8/1984 Bongers et al. ...................... 280/777

FOREIGN PATENT DOCUMENTS 3045141 6/1982 Fed. Rep. of Germany .

Primary Examiner—John J. Love
Assistant Examiner—Kenneth R. Rice
Attorney, Agent, or Firm—W. G. Fasse; D. H. Kane, Jr.

[57] ABSTRACT

A safety steering column made of wound fiber-reinforced synthetic material is manufactured economically and simply, yet simultaneously with due regard to its deformation characteristics in response to axial compressive overloading under various operating conditions. For this purpose the steering column is wound as a rotationally symmetrical tubular body having five component integral sections (3, 4, 5, 6, and 7). The component sections (3 and 7) are relatively thick-walled connecting tubes to provide a torque input section and a torque output section provided with connectors (8) for steering wheel hub and for a steering mechanism. An intermediate section (5) of the steering column is a cylindrical, relatively thin-walled tube with a larger diameter ($d_2$) compared to the connecting sections. Conical transition sections (4 and 6) preferably extend between the intermediate section and the connecting tubes or sections. The wall thickness of these transition sections diminishes uniformly from the connecting section in the direction toward the intermediate section for improving the buckling ability. A geodetic winding procedure is preferably applied for winding the columns.

9 Claims, 3 Drawing Figures

SAFETY STEERING COLUMN MADE OF FIBER-REINFORCED SYNTHETIC MATERIALS

FIELD OF THE INVENTION

The invention relates to a safety steering column made of fiber-reinforced synthetic materials. Such column has a buckling section intermediate its ends and is wound as a body of rotational symmetry provided with connection members for a steering wheel hub and for a steering drive mechanism.

DESCRIPTION OF THE PRIOR ART

Safety steering columns for motor vehicles must preferably be torsionally rigid so that steering forces may be transmitted indirectly from a steering wheel hub to a steering drive or gear mechanism. Additionally, such columns should, however, be relatively bendable or flexible at least in a specific region for providing a buckling ability. In particular, these columns should exhibit a minimal compressive strength so that in case of an accident, the forces that act upon the steering column in the longitudinal direction would buckle the steering column for preventing an injury to the driver of a vehicle.

It has been suggested to wind such safety steering columns, at least partially, out of fiber-reinforced materials. A safety steering column is known from German Patent Publication DE-OS 3,045,141 which has a safety sleeve of wound fiber-reinforced synthetic material operably connected into the column as an element that can deform upon impact. The safety sleeve is constructed as a grid or lattice tubular member with fiber strand belts crossing each other. The winding angle of the individual fiber strand belts in this case corresponds essentially to $\pm 45°$. Parts of the steering column that are connected to the safety sleeve may also be constructed as separately wound members. When such a steering column buckles, the fiber strand belts are deformed until the crossing points or junctions between the fiber strand belts and finally also the fiber strand belts themselves break, so that the entire steering column is shortened. The separate components require an assembly and the winding operations for winding the separate components are not suitable for the purposes of the invention.

OBJECTS OF THE INVENTION

In view of the above it is the aim of the invention to achieve the following objects singly or in combination:

to construct a safety steering column of fiber-reinforced synthetic material in such a way that its one-piece body of rotational symmetry may be wound by a winding operation or procedure suitable for large scale or mass production purposes yet capable of assuring desired steering column characteristics for a wide range of applications;

to wind fiber-reinforced materials in a single winding operation into a steering column which has a buckling ability in response to axial compressive loads for protecting a driver; and to construct the steering column in such a way that by modifying a small number of parameters, such as three parameters, the strength characteristics along the length of the column may be varied for satisfying different operational requirements.

SUMMARY OF THE INVENTION

According to the invention the entire safety steering column is wound as a one-piece, integral body of rotational symmetry. By selecting the parameters of the winding angle, of the wall thickness, and of the diameter relationships for the respective column sections, it is possible to construct the safety steering column in a single continuous winding process in such a way that each of its sections has its desired characteristic, e.g. stiffened against bending and torsion or having the required deformability or buckling ability during axial overloading of the column. The present column has an intermediate axially flexible or relatively weak section between two transition sections connecting the intermediate section to a torque input section and to a torque output section, whereby all sections are formed in a single numerically controlled winding operation forming a single piece, integral steering column.

The present steering column is advantageously wound geodetically, that is, the winding angle $\alpha$ and the respective tube or pipe radius r at various points along the column are determined by Clairout's Law:

$$r_1 \cdot \sin\alpha_1 = r_2 \cdot \sin\alpha_2 \tag{1}$$

A surface is determined for the geodetic winding in the preferably conical transition section of the steering column as a hyperboloid so that a straight fiber extending tangentially to the small diameter $d_1$ is laid down on this surface with the winding angle $\alpha_1$. The hyperboloid is definitely determined by the parameters $d_1$, $\alpha_2$, $d_2$ and the linear tangential requirement. The fiber is kinked at the transition to the diameter $d_2$ and is laid down at a winding angle $\alpha_2$ by a helical winding process in the flexible buckling section.

The opening angle $\beta$ of the conical sections is determined by the following relationship:

$$\tan\alpha_2 = \frac{r_2}{r_2 r_1} \cdot \sqrt{1 - \left(\frac{r_1}{r_2}\right)^2} \cdot \tan\beta. \tag{2}$$

The respective connecting or torque transmitting sections and the thin-walled cylindrical intermediate section are homogeneously wound tube sections as a result of this winding process, whereas the conical transition sections are not uniformly wound, because the wall strength is reduced corresponding to the diameter increase from the connecting section up to the diameter of the intermediate section. Additionally, the winding angle varies in the conical transition sections according to the formula given above and corresponding to the local diameters.

During an impact accident causing an axial compressive overload of the steering column, only compressive load components arise in the homogeneous tube sections forming the torque transfer sections. However, a buckling of the steering column in the conical transition sections is induced by bending load components caused by the axial thrust forces effective in the adjacent homogenous connecting tube sections, whereby a transverse load component caused by the circumferential tensions resulting in the coneshaped shell of the transition sections, is superimposed on said bending load components.

The steering column according to the invention can be simply and economically produced by a mass production operation. A lost core, for example of synthetic foam or the like, is used for the winding of the transition sections and the preferably cylindrical flexible intermediate section of the steering column.

The lost core remains in place after the winding of the steering column has been completed. The fibers are laid onto the winding mandrel during the winding process in such a way that a high skid resistance is provided.

A substantial advantage of the invention lies in that the strength characteristics or properties of the safety steering columns for different fields of application may be determined by only three parameters, namely the diameter, more specifically, the diameter ratios of the different tube sections, the winding angle, and the wall strength ratios of the tube sections. Thus, it is possible to wind or wrap the connecting tubes or torque transmitting column sections to have closed or solid walls and to choose their wall thickness so that at least parts of the expanded diameter sections of the steering column namely the conical transition sections and the cylindrical intermediate section have a lattice or netting structure. The choice of the distribution pattern permits modifying the circumferential strength of these sections, more specifically, such circumferential strength can be substantially lowered by this grid or lattice or netting structure.

Incidentally, all sections of the present steering columns transmit torqre but only the conical transition sections and the intermediate section participates in the buckling action.

BRIEF FIGURE DESCRIPTION

In order that the invention may be clearly understood, it will now be described, by way of example, with reference to the accompanying drawings, wherein.

Figure 1:
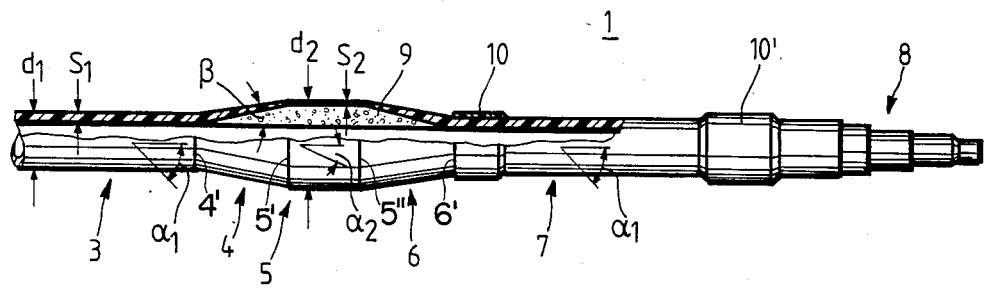
FIG. 1 is a longitudinal side view, partially in section, of a safety steering column according to the invention with an expanded flexible intermediate section serving as a deformable buckling element.
Figure 2:
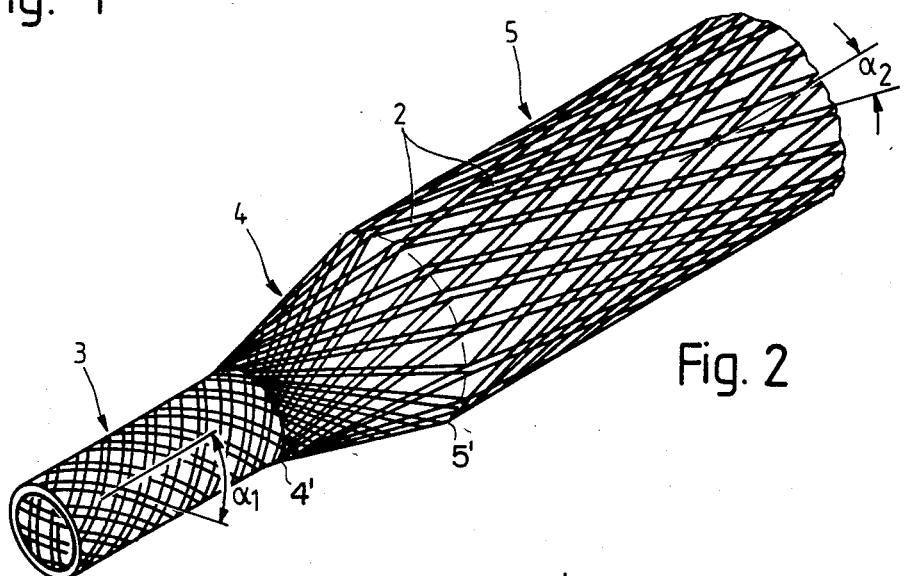
FIG. 2 shows a perspective partial view of the steering column according to FIG. 1 in the region of the expanded section.
Figure 3:
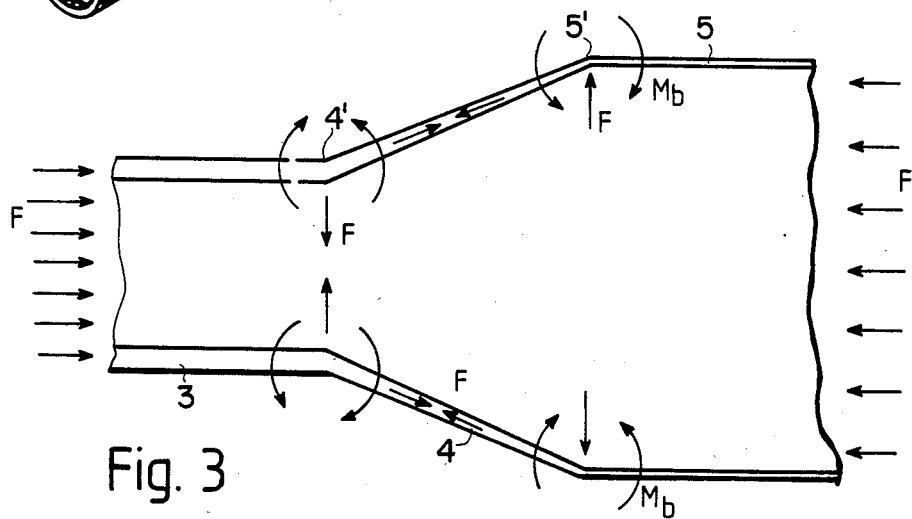
FIG. 3 is a schematic illustration of the expanded section for showing the forces and moments arising during an axial compressive loading of the column.

DETAILED DESCRIPTION OF PREFERRED EXAMPLE EMBODIMENTS AND OF THE BEST MODE OF THE INVENTION:

A safety steering column 1 is wound of fiber strand belts 2 shown in FIG. 2 in a single winding operation as taught herein. These belts 2 are bonded to each other by the curing of the resin in which the fibers are embedded. The column comprises five component sections 3, 4, 5, 6, and 7. The component section 3 is a thick-walled tube with a wall thickness $S_1$, a diameter $d_1$, and a winding angle $\alpha_1$. The tube is constructed to be relatively rigid to bending and torsional moments to thereby form a torque input section 3. The torque is applied by a steering wheel not shown but secured to section 3. The component section 7 is also constructed as a thick-walled connecting tube in a similar manner for providing a torque output section 7 connected to a steering drive mechanism not shown. The ends of both connecting sections 3, 7 are constructed so that steering mechanisms and steering wheel hubs can be flange mounted, for example, to these sections 3 and 7. Connecting means 8 are schematically represented for the connecting section 7. The component sections 4 and 6 are conical transition sections. The wall thickness in the transition section 4, which connects to the torque input section 3, starts at $S_1$ and is reduced to a value $S_2$ in accordance with the diameter increase to $d_2$, whereby the wall thickness decreases linearly in the direction toward an intermediate section 5 as best seen in FIG. 3. The winding angle of section 4 varies because of the geodetic winding also in accordance with the increasing diameter. Thus, at the interface 4' the wall thickness of the section 4 is $S_1$, but at the interface 5' it is $S_2$.

A thin-walled cylindrical tubular member formns said intermediate section 5 having a wall thickness $S_2$ and a diameter $d_2$. The section 5 transmits torque and is capable of buckling in response to an excess axial load. The section 5 merges into the conical transition section 4 at the interface 5'. Corresponding to the larger diameter $d_2$, the winding angle $\alpha_1$ in this section 5 is relatively small. The section 5 is torsionally rigid, yet axially flexible or relatively weak.

The second conical transition section 6 is connected to the intermediate section 5 at the interface 5" and its diameter is reduced to that of the connecting torque output section 7 for a steering mechanism. The diameter of the section 7 is generally also chosen to be $d_1$, but not necessarily. The steering column 1 is wound in a continuous computer controlled process and whereby a geodetic or non-geodetic winding procedure may be employed. Such winding procedures are known as such.

The varying diameters, wall thicknesses, and winding angles, as well as the opening angle $\beta$ of the conical transition sections 4 and 6, are chosen with regard to the formulas disclosed above, for a geodetic winding, so that the steering column has the desired deformation characteristic in response to an axial compressive overloading. The expanded portion of the space in the conical transition sections 4 and 6 and in the intermediate section 5 is filled by a hollow foam core 9 serving as a winding mandrel during the winding operation and remains as a lost core in the steering column after its completion. The core 9 is preferably made of a heat resistant synthetic material.

The connecting torque output section 7 is wound with the same winding angle $\alpha_1$ as connecting torque input section 3, and comprises two additional windings, for example, radial windings 10 and 10' serving as bearing seats for the steering column bearings. Similar radial windings can also be provided on the section 3. Winding 10 may be located directly adjacent the interface 6' between sections 6 and 7.

In the illustrated steering column, the wall thickness $S_1$ of the sections 3 and 7 is chosen in accordance with the winding angle so that at least a partial lattice or netting structure results in the region of the expanded sections comprising the conical transition sections 4 and 6 and the intermediate section 5, as shown in FIG. 2.

FIG. 2 clearly shows how the winding angle $\alpha_1$, which is uniform in the connecting section 3, is reduced in the transition section 4 as the diameter increases, due to the geodetic winding procedure. The winding angle becomes a relatively small winding angle $\alpha_2$ in the intermediate section 5. FIG. 2 also shows how the winding structure of the steering column formed by the crossing fiber strand belts 2 progressively changes from a substantially closed wall structure in the sections 3 and 7 to a substantially open netting or lattice structure in the expanded sections 4, 5, 6.

The present steering column is manufactured as follows. First, a winding mandrel (not shown in the drawings) is provided with a completely finished foam core 9 and with the connectors 8 for a steering mechanism and a steering wheel hub. Then, the fiber strand belts 2 are laid down according to a geodetic or a non-geodetic thread guidance providing the respective winding angles. Afterward, the radial windings 10 and 10' are wound for the bearing surfaces of the steering column. The component work piece manufactured in this way is then cured or hardened and machined. Specifically, the bearing seats are turned and the steering column is cut to a specific length. Upon completion of these steps, the winding mandrel is pulled out, but the core 9 is left in place. The steering column is then put through a finishing operation. For example, guide slits to ensure a well defined rotational orientation are machined into the column. The result is an inherently torsionally rigid safety steering column having a certain deformation or buckling characteristic in response to axial overloading.

FIG. 3 illustrates the forces and moments occurring during such axial compressive overloading of the steering column by a force F. Only compressive stresses arise in the homogeneous steering column sections 3, 5, and 7. Bending moments $M_b$ are generated by the transition into the conical transition sections, in particular, into the first transition section 4 at the kinks or interfaces 4' and 5' between the transition section 4 and the connecting section 3, as well as the intermediate section 5 respectively. These bending moments $M_b$ are superimposed by circumferential tension stress components within the conical shell of the transition section 4. In this way, the structure of the transition section 4 breaks up and the steering column can be axially shortened. By choosing the winding angles and thereby also the opening angle $\beta$ of the conical transition sections 4, 6, the circumferential tensions and the permissible bending moments can be influenced so that the desired deformation within the wound laminates may be caused by transverse stress and/or bending transverse to the laminate winding. Although the invention has been described with reference to specific example embodiments, it will be appreciated, that it is intended to cover all modifications and equivalents within the scope of the appended claims.

What is claimed is:

1. A safety steering column made of wound fiber-reinforced synthetic material, comprising a plurality of sections forming a body of rotational symmetry for facilitating a fiber winding operation said sections comprising a tubular torque input section (3) stiffened against bending and torsion for connection to a steering wheel hub, a tubular torque output section (7) stiffened against bending and torsion for connection of the steering column to a steering mechanism, a thin-walled, torsionally rigid and axially flexible intermediate section (5), said intermediate section having an outer diameter larger than said torque input and torque output sections, a first transition section (4) operatively interconnecting said torque input section to said intermediate section (5), and a second transition section (6) operatively interconnecting said intermediate section to said torque output section (7), all of said sections forming a one-piece would steering column structure, and wherein said first and second transition sections (4, 6) have a conical shape and a wall thickness which decreases linearly in the direction toward said intermediate section (5) for providing an improved buckling ability.

2. The steering column of claim 1, further comprising additional winding means (10, 10') wound on said torque input section (3) and said torque output section (7) for providing bearing surfaces and force introducing points.

3. The steering column of claim 1, wherein said intermediate section (5) comprises a fiber winding angle ($\alpha_2$) which is different from the fiber winding angle ($\alpha_1$) of said torque input section (3) and of said torque output section (7).

4. The steering column of claim 3, wherein said fiber winding angle ($\alpha_2$) of said intermediate section (5) is smaller than said fiber winding angle ($\alpha_1$) of said torque input section (3) and of said torque output section (7).

5. The steering column of claim 1, wherein said body of rotational symmetry is a geodetically wound body of said fiber-reinforced synthetic material.

6. The steering column of claim 1, wherein said body of rotational symmetry comprises a winding structure forming a lattice or netting, at least partially, in the region of said intermediate section (5) and in the region of said transition sections (4, 6).

7. The steering column of claim 1, wherein said body of rotational symmetry of said steering column (1) comprises a substantially closed wall structure of fiber reinforced synthetic material at its ends, and a substantially open netting structure in said transition sections and in said intermediate section.

8. The steering column of claim 1, further comprising lost core means (9) located in said intermediate section (5) of said steering column (1).

9. The steering column of claim 8, wherein said lost core means (9) comprises a synthetic material that is substantially heat resistant.

* * * * *

UNITED STATES PATENT AND TRADEMARK OFFICE
CERTIFICATE OF CORRECTION

PATENT NO. : 4,589,679
DATED : May 20, 1986
INVENTOR(S) : Peter Wackerle et al

It is certified that error appears in the above-identified patent and that said Letters Patent is hereby corrected as shown below:

Claim 1, line 4, (column 5, line 52) after "operation" insert --,--,

Claim 1, line 18, (column 6, line 13) replace "would" by --wound--,

Claim 8, line 2, (column 6, line 48) after "located" insert --at least--.

Signed and Sealed this

Twenty-sixth Day of August 1986

[SEAL]

Attest:

DONALD J. QUIGG

Attesting Officer

Commissioner of Patents and Trademarks